Aug. 18, 1959 G. H. BARNES 2,900,532
COMPENSATING CIRCUIT
Filed April 15, 1957

INVENTOR.
GEORGE H. BARNES
BY
Edward W. Hughes
ATTORNEY

United States Patent Office 2,900,532

Patented Aug. 18, 1959

2,900,532

COMPENSATING CIRCUIT

George H. Barnes, Berwyn, Pa., assignor to Burroughs Corporation, Detroit, Mich., a corporation of Michigan Application April 15, 1957, Serial No. 652,855

5 Claims. (Cl. 307—88.5)

This invention relates to frequency discriminators and more particularly to "wow and flutter" compensating circuits for discriminators adapted to have applied to them signals reproduced from recordings.

In telemetry it is generally the practice to record the signals received at a receiving station. In FM/FM radio telemetry systems, the composite signals produced by the radio receiver are normally recorded and may be simultaneously applied through band pass filters to subcarrier discriminators. At a later time, the composite signals are reproduced from the recording and applied to subcarrier discriminators in order to more carefully examine the data received, or to apply the outputs of the various subcarrier discriminators to more accurate instruments.

While the recording and playback devices are constructed to minimize variations in the speed at which the media, on which the composite signals are recorded, passes both the write and read heads, there are always some speed variations which produce shifts in the frequencies of the composite signals from their correct values. These frequency shifts, which are not normally constant, are referred to in the art as "wow and flutter." In order to compensate for "wow and flutter," it is the practice to record a reference signal of a known constant frequency, such as 100 kc., on the recording media at the same time that the composite signals from the receiver are recorded. Any change in frequency of the reproduced reference signal from its original value is a measure of the frequency shifts introduced by the recording and playback apparatus.

Because the practice of recording the composite signals as they are received at the receiving station is almost universal in the telemetry art, it is necessary in order for a discriminator to be acceptable as a subcarrier discriminator, that means be provided to compensate for frequency shifts of the recorded signals introduced by the recording and playback apparatus. The compensating circuit described and claimed is adapted to be used with a discriminator of the type described and claimed in U.S. patent application Serial No. 650,122, filed April 2, 1957, entitled "Discriminator," by Robert M. Tillman, which application is assigned to the assignee of this invention, but it is not limited to being used only with such a discriminator.

It is therefore an object of this invention to provide an improved compensating circuit for a subcarrier discriminator which compensates for frequency shifts introduced by recording and playback apparatus used to reproduce recorded signals applied to the discriminator.

It is another object of this invention to provide an improved "wow and flutter" compensating circuit for a subcarrier discriminator of the pulse averaging type.

It is still another object of this invention to provide an improved solid state "wow and flutter" compensating circuit for a subcarrier discriminator of the pulse averaging type.

It is still another object of this invention to provide an improved transistor magnetic compensating circuit for a subcarrier discriminator of the pulse averaging type which is rugged, compact, reliable, light in weight, and which consumes a relatively small amount of power.

Other objects and many of the attendant advantages of this invention will be readily appreciated as the same become better understood by reference to the following detailed description when considered in connection with the accompanying drawings.

Figures 1, 2, 3:
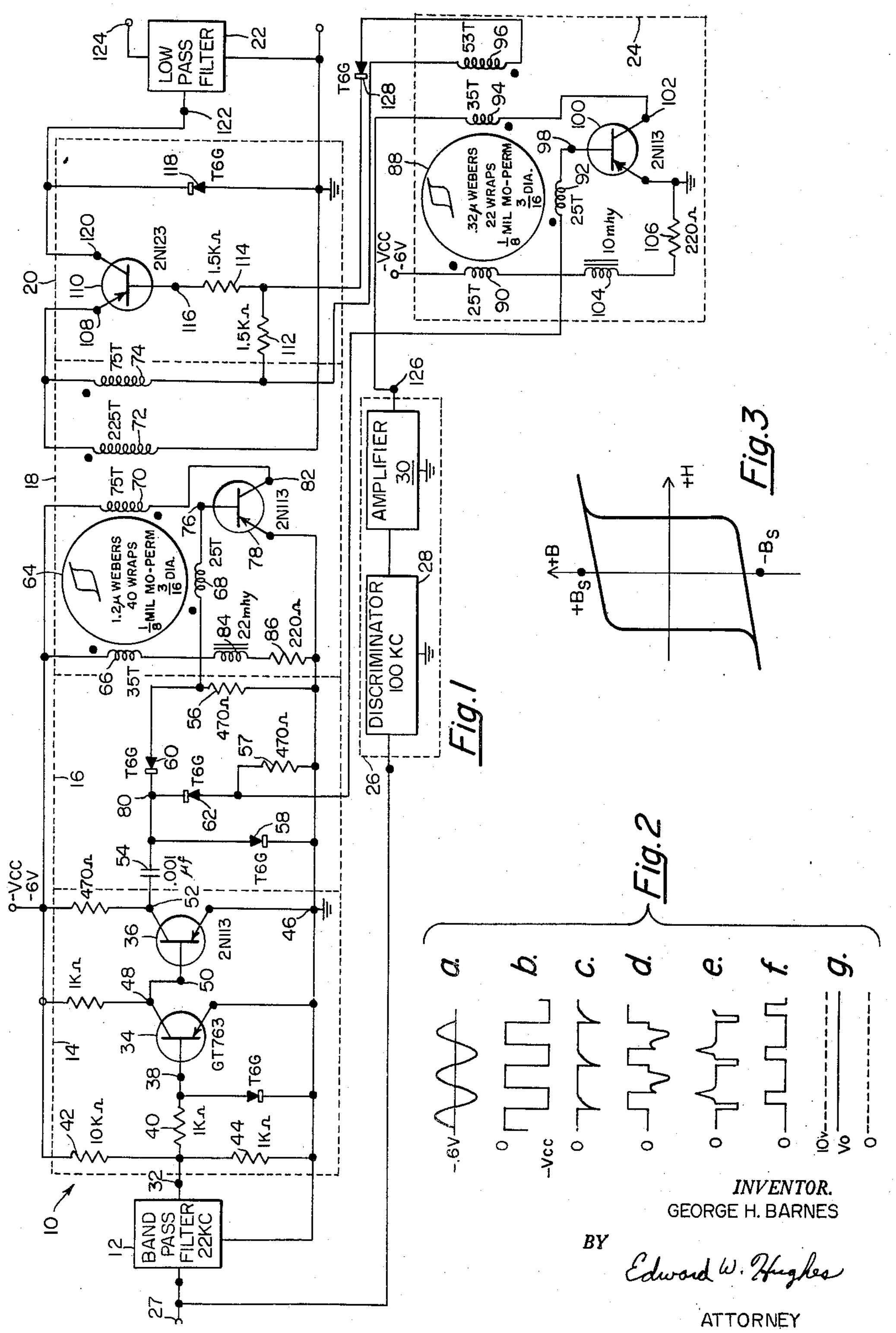
Fig. 1 is a schematic diagram of the "wow and flutter" compensating circuit and a subcarrier discriminator.
Fig. 2 is a chart of typical waveforms at various terminals of Fig. 1.
Fig. 3 is an idealized hysteresis curve of a magnetic material.

The cooperation between the compensating circuit and the discriminator circuit with which it is used, is so close that it is necessary to explain in some detail the operation of the discriminator in order to understand the operation of the compensating circuit. Discriminator 10 comprises a band pass filter 12, an amplifying circuit 14, a differentiating circuit 16, a pulse source, or blocking oscillator 18, a rectifying circuit 20, and a low pass filter 22. The "wow and flutter" compensating circuit is comprised of a second pulse source, or blocking oscillator 24, which is adapted to have applied to it an error, or "wow and flutter" voltage, derived from source 26. The amplitude of the error voltage produced by source 26 is a function of the difference between the frequency of the recorded reference signal which forms a part of the composite signals applied to input terminal 27 and the correct frequency of the reference signal. Source 26 is illustrated in Fig. 1 as being comprised of discriminator 28 and amplifier circuit 30. Discriminator 28 may be of the same type as discriminator 10 except that its center frequency, in the example illustrated, is 100 kc. The output signal of discriminator 28 is amplified by amplifier circuit 30 before it is applied to blocking oscillator 24.

Signals applied to input terminal 27 which are within the band width of filter 12 are applied to input terminal 32 of amplifying circuit 14. The waveforms of the signals applied to terminal 32 are essentially sinusoidal, as illustrated in Fig. 2*a*. The center frequency of filter 12 is shown to coincide with the center frequency of one of the standard subcarrier channels used in telemetry, in example illustrated, the center frequency of filter 12 is 22 kc. Transistors 34, 36 of amplifying circuit 14 are pnp junction transistors in the common emitter configuration. Base 38 of transistor 34 is connected by resistor 40 to amplifier input terminal 32. The potential of input terminal 32 is maintained at the proper D.C. voltage level by the voltage dividing network which consists of resistors 42, 44 connected in series between source of collector potential $V_{cc}$, which is not illustrated, and point 46 which is at reference, or ground potential. Collector 48 of transistor 34 is directly connected to the base 50 of transistor 36. The gain of amplifier 14 is sufficiently large so that the signal applied to terminal 32 is amplitude limited with the result that the waveforms of the potential of collector 52 of transistor 36 is substantially a square wave as illustrated in Fig. 2*b*.

The square wave output signal of amplifier 14 is applied to differentiating circuit 16. Differentiating circuit 16 consists basically of capacitor 54 and resistors 56, 57. Resistors 56, 57 are connected in parallel, and they, in turn, are connected in series with capacitor 54 between collector 52 of transistor 36 and ground. Diodes 58, 60, 62 are added to prevent positive going pulses from being produced by differentiating circuit 16. Output, or trigger, pulses as illustrated in Fig. 2*c* are produced by differentiating circuit 16 and are negative going. They are applied through diode 60 to blocking oscillator 18 and through diode 62 to blocking oscillator 24. In the embodiment illustrated, one trigger pulse is produced for each cycle of the signal applied to terminal 32, or the frequency of the trigger pulses produced by differentiating circuit 16 is the same as the frequency of the signal applied to terminal 32.

Blocking oscillator 18 is comprised of a magnetic core 64, preferably toroidal and made of a magnetic material having substantially rectangular hysteresis loops. Core 64 has wound on it, windings 66, 68, 70, 72 and 74. Each of the windings 66, 68, 70, 72 and 74 is illustrated as having one of its two terminals dotted. By convention the coils are wound on core 64, for example, in such a direction that when conventional electrical current flows into the dotted terminal of a winding the magnetic flux produced by the current will tend to switch such a core to its "0" magnetic state; and when conventional electrical current flows out of the dotted terminal the magnetic flux produced by the current will tend to switch such a core to its "1" magnetic state. Referring to Fig. 3, the "0" magnetic state of a core may be defined as occurring when a core has a flux density of $-B_s$ and the "1" magnetic state of a core may be defined as occurring when a core has a flux density of $+B_s$.

The undotted terminal of base winding 68 is connected to the base 76 of transistor 78 and the dotted terminal of base winding 68 is connected through diode 60 to terminal 80 of differentiating circuit 16. The undotted terminal of the collector, or load winding, 70 is connected to the source of collector potential Vcc; and the dotted terminal of winding 70 is connected to the collector 82 of transistor 78. The dotted terminal of bias winding 66 is connected to the source of collector potential Vcc, and its undotted terminal is connected through inductor, or coil, 84 and resistor 86 to ground. Transistor 78 is, in the circuit illustrated, a pnp junction transistor in the common emitter configuration.

Core 88 of blocking oscillator 24 is also preferably toroidal and also made of magnetic material having a substantially rectangular hysteresis loop. Core 88 has wound on it windings 90, 92, 94 and 96, each of the windings is illustrated as having one of its two terminals dotted. The significance of a dotted terminal is the same as previously defined. The undotted terminal of base winding 92 is connected to the base 98 of transistor 100, its dotted terminal is connected through diode 62 to terminal 80 of differentiating circuit 16. The undotted terminal of collector winding 94 is adapted to be connected to the source 26 of the error, or "wow and flutter," voltage and the dotted terminal of winding 94 is connected to the collector 102 of transistor 100. The dotted terminal of bias winding 90 is connected to the source of collector potential Vcc and its undotted terminal is connected through inductor 104 and resistor 106 to ground. Transistor 100 is, in the circuit illustrated, a pnp junction transistor, in the common emitter configuration.

Blocking oscillators 18, 24, are similar in construction and in operation. In order to avoid unnecessary repetition, only the operation of blocking oscillator 18 will be described in detail. The difference between oscillators 18, 24, will be pointed out subsequently. In the absence of a negative trigger pulse at terminal 80 of differentiating circuit 16, terminal 80 will be substantially at ground potential, and likewise base 76 of transistor 78 will also be substantially at ground potential. As a result, transistor 78 will be cut off, and substantially no collector current will flow through collector winding 70. Direct current will be flowing through bias winding 66 since a D.C. circuit is provided between terminal 46 and the source of collector potential Vcc through inductor 84 and resistor 86. The bias current, in the circuit illustrated, is flowing out of the dotted terminal of winding 66. Its magnitude, which is determined by the magnitude of resistor 86 and the magnitude of Vcc, is made sufficiently large to switch core 64 and/or to maintain core 64 in its "1" magnetic state of saturation.

When a trigger pulse of sufficient duration and amplitude is applied through base winding 68 to the base 76 of transistor 78, transistor 78 will begin to conduct. Collector current will flow into the dotted terminal of collector winding 70, and this current starts to switch core 64 from its "1" to its "0" magnetic state. The change in the magnetic flux in core 64 as it switches from its "1" state toward its "0" state induces an E.M.F. in the base winding 68 which is of such polarity as to make the base 76 of transistor 78 more negative and to increase the base current of transistor 78. The process is cumulative, or regenerative, until transistor 78 becomes saturated or bottomed. When transistor 78 is saturated, its collector to emitter resistance is at a very low value, in the order of 1 ohm, and the voltage drop between its emitter and collector is of the order of 0.1 volt, so that practically all the supply voltage is applied across load winding 70. The time taken for transistor 78 to bottom, is quite small and depends to a large extent on the characteristic of the particular transistor used.

When core 64 reaches its "0" magnetic state, the rate of increase of the current supplied by transistor 78 needed to maintain regeneration becomes greater than transistor 78 is capable of supplying. The regenerative base voltage disappears and the collector current ceases. The D.C. current flowing through bias winding 66 then drives core 64 back to its "1" state where it will remain until the next trigger pulse is applied to base 76 of transistor 78. As core 64 switches back to its "1" state, an E.M.F. is induced in base winding 68, the polarity of which is such as to cause transistor 78 to cut off quickly.

Once the magnitude of Vcc has been established, the values of resistor 86 and inductor 84 and the number of turns of bias winding 66 of blocking oscillator 18 are chosen, so that core 64 will be switched to the "1" state within a short period of time after transistor 78 cuts off. It is, of course, necessary that the amount of current flowing through the bias winding and the resulting M.M.F. must not be so great that the collector current flowing through the collector winding 70 cannot quickly switch core 64 to the "0" state during the period of time the transistor 78 is bottomed. In general, the maximum period for switching core 64 from its "0" state to its "1" state and from its "1" state to its "0" state should not exceed one-half the period of highest frequency of the signals which discriminator 10 is designed to have applied to it. Inductor 84 has the function of reducing fluctuations in the amount of current flowing through bias winding 66.

Fig. 3 is an idealized rectangular hysteresis loop of a magnetic material such as cores 64, 88 may be made of. It is a characteristic of a magnetic core having substantially rectangular hysteresis loop that the total change in magnetic flux $\phi$ as the core switches from its "1" state to its "0" state or from its "0" state to its "1" state, is substantially a constant. This is based on the assumption that the temperature of the magnetic core is maintained substantially constant. The relation between the voltages induced in a winding and the change in magnetic flux through the winding is defined mathematically as:

$$e=kn\frac{d\phi}{dt} \qquad \text{Equation 1}$$

where:

$e$=voltage, in volts
$n$=number of turns of the winding
$k$=a constant
$\phi$=magnetic flux, maxwells
$t$=time, in seconds Integrating Equation 1 produces the following:

$$\int_{t=0}^{t=T} e\,dt=kn\int_{-\phi_s}^{+\phi_s} d\phi \qquad \text{Equation 2}$$

For a core having such a hysteresis loop as illustrated in Fig. 3, the total change in flux $\phi$ as the core switches from its "1" to its "0" state is:

$$\phi = 2aB_s \qquad \text{Equation 3}$$

where: $a$=the cross-sectional area of the core.

It thus follows that:

$$\int_{t=0}^{t=T} edt = kn\phi = K \qquad \text{Equation 4}$$

where: K is a constant.

Each time core 64, for example, switches from its "1" state to its "0" state, the voltage time product of the voltage induced in output winding 72, for example, will be a constant and the area of each pulse will be constant. When core 64 switches from its "0" to its "1" state, the voltage time product of the voltage induced in output winding 72 will be a constant and equal to the product of the pulse produced when the core switches from its "1" to its "0" state. The waveform of the voltages induced in output winding 72 of blocking oscillator 18 are illustrated in Fig. 2*d*. The positive rectangular pulses are induced in winding 72 as core 64 switches from its "1" state to its "0" state, and will be hereafter referred to as output pulses. Upon the application of a trigger pulse to the base 76 of transistor 78, transistor 78 quickly bottoms, and substantially all the voltage drop occurs across collector winding 70. The magnitude of the voltage induced in winding 66 is determined by the turns ratio between collector winding 70 and output winding 72. Since the voltage across winding 70 is substantially constant, the amplitudes of the output pulses will be substantially constant, and since the voltage time products of the output pulses are also constant, it follows that the pulse width of the output pulses will also be constant.

When core 64 reaches its "0" state, transistor 78 is quickly cut off due to the voltage inducing in winding 68 as bias winding 66 switches core 64 back to its "1" state. The voltages induced in winding 72 as core 64 switches from its "0" to its "1" state as shown in Fig. 2*d* are substantially irregular. The reason for this is that the impedance of the circuit including bias winding 66 is much higher during the time that winding 66 resets core 64 to its "1" state. The waveforms of the voltages induced in control winding 74 of oscillator 18 are similar to those induced in output winding 72, except that their amplitudes are smaller due to the smaller number of turns of winding 74 as compared with winding 72. The rectangular pulses induced in control winding 74, at the same time that output pulses are induced in output winding 72, will hereafter be referred to as control pulses. Control pulses and output pulses will have substantially equal pulse widths.

The voltages induced in output winding 72 and in control winding 74 of oscillator 18 are applied to rectifying circuit 20. The dotted terminals of wind 72, 74 are connected to the emitter 108 of pnp junction transistor 110. The undotted terminal of winding 72 is connected to ground, and the undotted terminal of winding 74 is connected through resistors 112, 114 to the base 116 of transistor 110. Diode 118 is connected between collector 120 of transistor 110 and ground and is designed to prevent collector 120 from going negative.

When core 64 switches from its "1" to its "0" state, the dotted terminals of winding 72, 74 are positive with respect to their undotted terminals. The control pulse induced in winding 74 forward biases the emitter base junction of transistor 110 so that the emitter to collector resistance of transistor 110 is low. A low impedance path then exists between the dotted terminal of output winding 72 and input terminal 122 of low pass filter 22. Thus the output pulse induced in winding 72 while core 64 switches from its "1" to its "0" state is applied to low pass filter 22 where they are averaged to produce a unidirectional voltage $V_0$ at output terminal 124, such as is illustrated in Fig. 2*g*. The amplitude of the output voltage $V_0$ is determined by the number of such pulses produced per unit of time. As core 64 switches from its "0" to its "1" state the voltage induced in control winding 74 is such that transistor 110 is cut off. A high impedance path then exists between the dotted terminal of output winding 72 and input terminal 122 of filter 22, so that the negative pulses induced in winding 72 are not applied to filter 22.

The magnitude of the voltage at output terminal 124, $V_0$, is related to the frequency $f$ of the signal applied to terminal 32 and the voltage time product A of the output pulses induced in winding 72 as follows:

$$V_0 = Af \qquad \text{Equation 5}$$

The value of A is constant because the value of $\phi$ for core 64 is constant. Any change in $f$ introduced by the recording and playback apparatus will cause $V_0$ to be in error by an amount proportional to the change in $f$ due to "wow and flutter."

The operation of blocking oscillator 24 is substantially the same as that of oscillator 18 which has been previously described. The pulses induced in compensating winding 96 are illustrated in Fig. 2*e*. The rectangular, or compensating pulses, are produced while transistor 100 is saturated and while core 88 is switching from its "1" to its "0" state. The more irregular shaped pulses are produced while core 88 is switching from its "0" to its "1" state.

Blocking oscillator 24 is designed so that the voltage time product of the compensating pulses induced in compensating winding 96 are considerably less than the output pulses induced in winding 72 of oscillator 18. Since the voltage time product of each compensating pulse is constant, it follows that as the amplitudes of the compensating pulses are increased, the widths of the compensating pulses are decreased, and vice versa. The output voltage of discriminator 28 of error voltage source 26 is a function of difference between the correct frequency of the reference signal and its frequency as it is reproduced. This voltage is amplified, preferably, by a conventional transistor amplifier circuit 30, so that the absolute value of the error voltage at terminal 126 increases as the frequency of the reference signal applied to discriminator 28 decreases, and vice versa, at a rate determined by the gain of amplifier 30. Thus, the widths of the compensating pulses induced in compensating winding 96 are an inverse function of the magnitude of the error voltage produced by source 26.

The undotted terminal of compensating winding 96 of blocking oscillator 24 is connected to the undotted terminal of control winding 74 of blocking oscillator 18. The dotted terminal of winding 96 is connected through diode 128 and resistor 114 to the base 116 of transistor 110 of rectifying circuit 20.

Trigger pulses are applied substantially simultaneously to both blocking oscillators 18, 24, and the transistors of both blocking oscillators saturate at substantially the same time. The turns ratio between load winding 94 and compensating winding 96 of blocking oscillator 24 are arranged so that the amplitudes of the compensating pulses induced in winding 96 are substantially equal to, or greater than the rectangular control pulses induced in control winding 74, even when the error voltage produced by source 26 is at its minimum value. The compensating pulses oppose the control pulses induced in control winding 74 and maintain transistor 110 of rectifying circuit 20 cut off for the duration of the compensating pulses. When a compensating pulse terminates, the control pulse induced in winding 74 will then cause transistor 110 to saturate; and the output pulse induced in winding 72 is then applied to low pass filter 22. Diode 128 functions to prevent the pulse induced in compensating winding 96 from possibly turning on transistor 110 while core 88 is being reset to its "1" state.

The "wow and flutter" blocking oscillator 24, thus produces narrow compensating pulses, the widths of which are a function of the difference between the correct frequency of the reference signal and its frequency as it is reproduced. The output pulses induced in output winding 72 as core 64 switches from its "1" to its "0" state have substantially constant amplitudes and widths since the collector supply potential Vcc is substantially constant. Control pulses induced in control winding 74 control the conductivity of transistor 110 to apply only the desired output pulses induced in output winding 72 to low pass filter 22. However, while a compensating pulse is simultaneously applied with a control pulse to transistor 110, transistor 110 will remain cut off. Rectifying circuit 20 thus, in effect, subtracts the pulse width of the compensating pulse induced in winding 96 from the pulse width of the output pulse induced in winding 72 to produce compensated output pulses as illustrated in Fig. 2*f*. As a result, the width, and the area of the compensated output pulses applied to low pass filter 22 are varied to compensate for "wow and flutter," and to prevent an error in $V_0$ at output terminal 124 due to deviations in frequency introduced by the recording and playback apparatus..

In the embodiment of the invention illustrated, one negative trigger pulse is produced for each cycle of the input signal applied to terminal 32 of discriminator 10. The ratio of the number of trigger pulses to the number of cycles of the signal applied to terminal 32 can be varied by the use of scaling circuits to raise or lower the frequency limits of the signals that discriminator 10 may have applied to it.

Blocking oscillators 18, 24 are illustrated as having trigger pulses applied to them simultaneously. The particular means for causing the output pulse, the control pulse, and the compensating pulse to start at substantially the same time in response to a trigger pulse is a matter of choice. Likewise the particular circuit for controlling transistor 110 of rectifying circuit is not critical.

In the example of the embodiments of the invention illustrated in Fig. 1, all the transistors have been illustrated and described as being pnp transistors. As is well known in the art, npn transistors may be substituted for pnp transistors provided the polarity of the supply voltages and the polarity of the triggering signals are reversed. Likewise, the direction of the windings on cores 64, 88 can be reversed without adversely affecting the operation of the compensating circuit and discriminator 10.

The values and/or types of components and the voltages appearing on the drawings are included, by way of example only, as being suitable for the devices illustrated. It is to be understood that circuit specifications in accordance with the invention may vary with the design for any particular application.

Obviously, many modifications and variations of the present invention are possible in the light of the above teachings. It is, therefore, to be understood that within the scope of the appended claims, the invention may be practiced other than as specifically described and illustrated.

What is claimed is:

1. In combination: first circuit means adapted to have an input signal applied to it, said first circuit means producing trigger pulses having substantially the same frequency as said input signal; a first blocking oscillator for producing output pulses, said output pulses having substantially constant amplitudes and pulse widths; a second blocking oscillator, a source of varying unidirectional error voltage, circuit means for applying the trigger pulses and the error voltage to said second blocking oscillator, said second blocking oscillator producing compensating pulses having substantially constant voltage time products, the width of each of said compensating pulses being a function of the magnitude of said error voltage; said first and second blocking oscillators responsive to each trigger pulse produced by said first means, producing an output pulse and a compensating pulse; the leading edges of said output pulses and said compensating pulse occurring substantially at the same time; second circuit means to which said output pulses and said compensating pulses are applied; and a low pass filter, said second circuit means providing a low impedance path for the output pulses from the first blocking oscillator to the low pass filter when a control pulse is applied to said second circuit means if a compensating pulse is not simultaneously applied to said second circuit means.

2. In combination: a subcarrier FM discriminator comprising; a band pass filter adapted to have applied to it a recorded frequency modulated composite signals; first circuit means connected to the band pass filter for squaring signals passed by the band pass filter; second circuit means connected to the first circuit means for producing one trigger pulse for a predetermined number of square waves applied to said second circuit means; a first blocking oscillator to which said trigger pulses are applied comprising, a magnetic core having a substantially rectangular hysteresis loop and a transistor, said core having five windings on it, a collector winding, a base winding, a bias winding, an output winding and a control winding, said windings and transistor being so connected that a unidirectional output pulse is induced in the output winding and a unidirectional control pulse is induced in said control winding for each trigger pulse applied to said first blocking oscillator, the pulse widths of said output pulses and said control pulses being substantially equal; a transistor rectifying circuit and a low pass filter, a second blocking oscillator, to which said trigger pulses are applied, comprising; a magnetic core having a substantially rectangular hysteresis loop and a transistor, said second blocking oscillator magnetic core having four windings on it, a collector winding, a base winding, a bias winding and a compensating winding, said collector winding adapted to be connected to a source of error voltage, the amplitude of which is substantially inversely proportional to the magnitude of shifts in frequencies of the composite signal, due to variations in the speed in the recording and playback means used to record and reproduce said composite signal, said second blocking oscillator producing unidirectional compensating voltage pulses in its compensating winding, the pulse widths of the compensating pulses being inversely proportional to the magnitude of said error voltage; means for applying the voltages induced in the compensating winding of the second blocking oscillator and in the output and control windings of the first blocking oscillator to the rectifying circuit, said rectifying circuit producing substantially constant amplitude compensated voltage pulses of one polarity, the pulse widths of which are equal to the difference in the pulse widths of the voltage pulses induced in the control winding and compensating winding of said first and second blocking oscillators; and circuit means for applying the compensated pulses to the low pass filter, said low pass filter circuit producing a unidirectional voltage, the amplitude of which is a function of the frequency of the signal passed through said band pass filter as recorded.

3. A discriminator comprising; circuit means adapted to have applied to it frequency modulated signals and producing one trigger pulse for each cycle of said frequency modulated signal; a first blocking oscillator to which said trigger pulses are applied for producing an output pulse for each trigger pulse applied to said first blocking oscillator, the amplitude and pulse width of said output pulses being substantially constant; circuit means for producing an error voltage which is a function of the deviation in frequency of a reference signal from a fixed value; a second blocking oscillator to which said error voltage and said trigger pulses are applied, said second blocking oscillator, responsive to each trigger pulse applied to it, producing a compensating voltage pulse whose width varies inversely with the magnitude of said error voltage; the width of said compensating pulses being less than the width of the output pulses produced by said first blocking oscillator; a rectifier circuit to which the output pulses of said first blocking oscillator and the compensating voltage pulses of said second blocking oscillator are applied, said rectifier circuit being rendered operative to pass an output pulse providing no compensating pulse is present, and a low pass filter to which the portion of the output pulses passed by the rectifier circuit are applied.

4. A discriminator comprising; a band pass filter adapted to have applied to it frequency modulated signals reproduced from a recording; circuit means to which signals passed by said filter are applied for producing one trigger pulse for a predetermined number of cycles of the signal applied to it; a first blocking oscillator to which said trigger pulses are applied, said first blocking oscillator responsive to each trigger pulse, producing an output pulse; circuit means for producing an error voltage, the amplitude of which is a function of the magnitude of the shift in frequency of the recorded signal due to variations in the speed of the recording and playback means used to record and reproduce said frequency modulated signals; a second blocking oscillator to which said error voltage and said trigger pulses are applied, said second blocking oscillator, responsive to each trigger pulse, producing a compensating voltage pulse, the widths of which compensating pulses are a function of the magnitude of said error voltage; a low pass filter and a rectifier circuit; circuit means for applying the output pulses of said first blocking oscillator and the compensating voltage pulses of said second blocking oscillator to said rectifier circuit, said rectifier circuit providing a unidirectional low impedance circuit for applying said output pulses to said low pass filter if no compensating pulse is applied to said rectifier, said low pass filter circuit producing a unidirectional voltage.

5. A discriminator comprising; a band pass filter adapted to have applied to it a recorded frequency modulated composite signal; first circuit means connected to the band pass filter for squaring signals passed by the band pass filter; second circuit means connected to the first circuit means for producing one trigger pulse for a predetermined number of square waves applied to said second circuit means; a first blocking oscillator to which said trigger pulses are applied comprising, a magnetic core having a substantially rectangular hysteresis loop and a transistor, said core having a collector winding, a base winding, a bias winding, an output winding and a control winding, said windings and transistor being so connected that an output pulse is induced in the output winding and a control pulse is induced in said control winding for each trigger pulse applied to said first blocking oscillator, the pulse widths of said output pulses and said control pulses being substantially equal; a rectifying circuit including a transistor having a base, an emitter and a collector; a low pass filter; a source of error voltage, the amplitude of which is substantially inversely proportional to the magnitude of shifts in frequencies of the composite signal, due to variations in the speed in the recording and playback means used to record and reproduce said composite signal, and a second blocking oscillator, to which said trigger pulses and said error voltage are applied, said second blocking oscillator comprising; a magnetic core having a substantially rectangular hysteresis loop and a transistor, said second blocking oscillator magnetic core having a collector winding, a base winding, a bias winding and a compensating winding, said collector winding adapted to be connected to the source of the error voltage, the second blocking oscillator producing, responsive to each trigger pulse, a compensating voltage pulse in its compensating winding, the pulse widths of the compensating pulses being inversely proportional to the magnitude of said error voltage and less than that of the control pulses, the amplitude of said compensating pulses being greater than said control pulses; circuit means for applying the output pulses between the emitter and collector of the transistor of the rectifying circuit; circuit means for applying the control pulses between the emitter and base of the transistor of the rectifying circuit; and circuit means for applying compensating pulses between the emitter and base of the transistor of the rectifying circuit; circuit means for connecting the collector of the transistor of the rectifying circuit to said low pass filter, whereby a low impedance path is provided between the output windings of the first blocking oscillator and the low pass filter, when a control pulse is induced in the control winding of said first blocking oscillator and a compensating pulse is not produced in the compensating winding of said second blocking oscillator; said low pass filter circuit producing a unidirectional voltage, the amplitude of which is a function of the frequency of the signal passed through said band pass filter as recorded.

References Cited in the file of this patent

UNITED STATES PATENTS

| | | |
|---|---|---|
| 2,118,626 | Smith | May 24, 1938 |
| 2,421,138 | Wheeler | May 27, 1947 |
| 2,519,778 | Mizen | Aug. 22, 1950 |
| 2,567,247 | Spalding | Sept. 11, 1951 |
| 2,572,080 | Wallace | Oct. 23, 1951 |
| 2,713,677 | Scott | July 19, 1955 |